Figure 4:
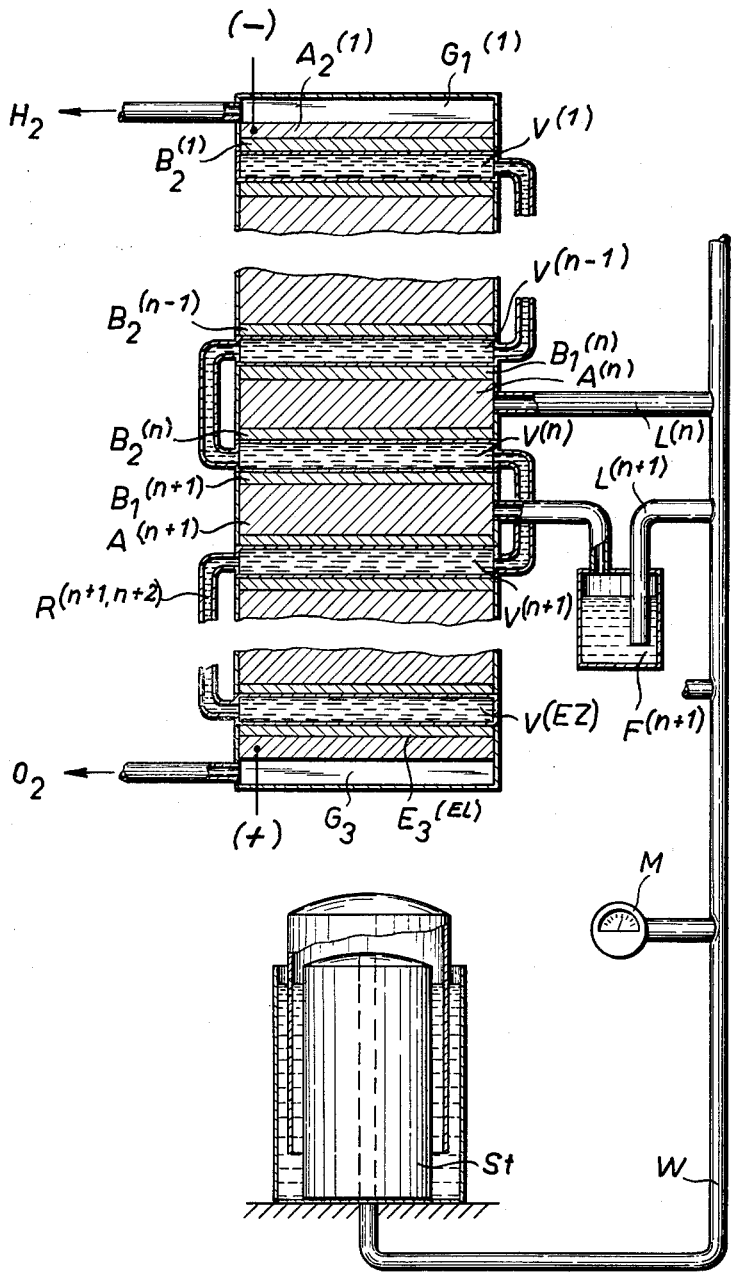

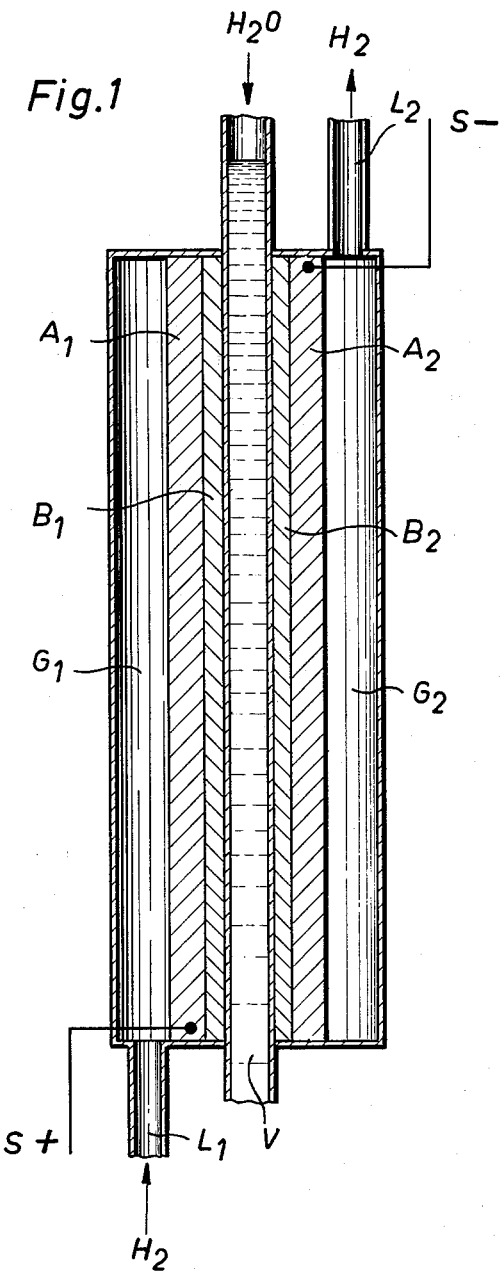

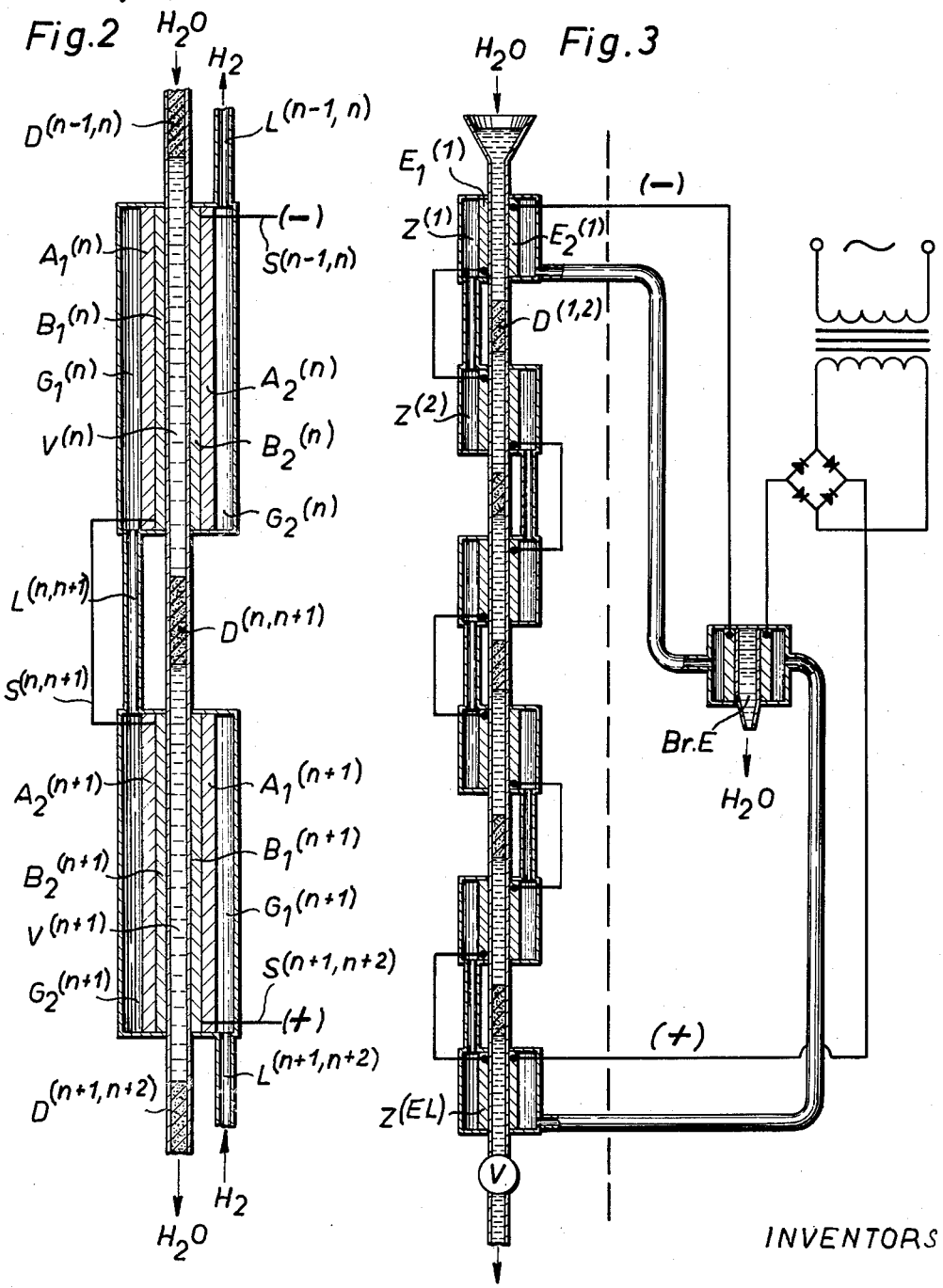

United States Patent Office 3,256,163
Patented June 14, 1966

3,256,163
PROCESS FOR THE CONTINUOUS PRODUCTION OF DEUTERIUM-RICH WATER BY STEPWISE ENRICHMENT WITH DEUTERIUM AND ELECTROLYSIS OF WATER
August Winsel and Eduard Justi, Braunschweig, Germany, assignors, by mesne assignments, to Varta Aktiengesellschaft, Hagen, Westphalia, Germany, and Siemens-Schuckert-Werke Aktiengesellschaft, Erlangen, Germany
Filed May 11, 1960, Ser. No. 28,475
Claims priority, application Germany, May 22, 1959, R 25,593
4 Claims. (Cl. 204—101)

This invention relates to the continuous production of deuterium-rich water from natural water by an electrochemical process in a separating column which operates largely reversibly.

As is known, deuterium is admixed in nature with light hydrogen in an amount of about 0.014% by volume, i.e. one part of $D_2O$ or 2 parts of HDO fall to every 7000 parts of $H_2O$. Since, in electrolytic decomposition of water, the $H_2O$ molecules due to their lower overvoltage are easier decomposed than those molecules which contain the heavy hydrogen isotope, the $D/H$ ratio in the hydrogen evolved in electrolysis is smaller by about the separating factor $s=5$ than in undecomposed water. In catalytically establishing the thermodynamic equilibrium between gaseous hydrogen and water or steam, the separating factor is only about $s=3$. In commercial production of heavy water, the electrolytic enrichment has been carried out for a long time in a multi-stage process in which the gases evolved in higher stages of the electrolysis were recombined in contact furnaces to form water which had a higher deuterium concentration than that of natural water and which was returned into a preceding stage of the enrichment unit corresponding to this deuterium concentration.

In another known process, the gases evolved in the electrolysis are passed to the electrodes of an oxygen-hydrogen fuel cell, which electrodes are advantageously constituted by double skeleton catalyst electrodes known per se, and the effective work of detonating gas combustion, in contrast to the first-mentioned process, is largely reconverted into electrical energy which in turn is passed into the electrolysis. Thus, the amount of energy necessary in this mode of operation is only that which is lost as the heat of reaction in the recombination of the electrolytic gases. As an alternative, the electrochemical reduction of deuterium content in hydrogen gas may be effected by means of a known cell having two hydrogen electrodes as disclosed in German Patent No. 1,023,017, of which one operates as a reversible hydrogen electrode and the other as a reversible evolution electrode. Hydrogen having a deuterium concentration about equal to that of the electrolyte is supplied to the former where it goes into solution, whereupon the same quantity of hydrogen having a deuterium content which is lower by the electrolytic separating factor is evolved at the last-mentioned electrode. In this method, only the energy losses which due to low polarization occur at the two reversible hydrogen electrodes have to be made up for.

The difficulties mentioned above are overcome by the invention which provides a process for the continuous production of deuterium-rich water from water which is poor in deuterium and preferably natural water in a separating column comprising an electrolytic water-decomposition cell and one or a plurality of enrichment cells each equipped with a hydrogen anode and a hydrogen cathode. The process is characterized in that the water which is poor in deuterium flows through the enrichment cells $Z^{(1)}$ to $Z^{(n)}$ in counter-current flow relation with the hydrogen current and is then decomposed electrolytically in the electrolytic cell $Z^{(\text{El})}$ except for a portion to be continuously withdrawn from this cell. Electrolytic oxygen is removed from the anode of the decomposition cell and out of the system while the electrolytic hydrogen, for the purpose of deuterium exchange with the water, passes from the cathode of the decomposition cell $Z^{(\text{El})}$ and through the enrichment cells $Z^{(n)}$ to $Z^{(1)}$ which are series-connected with this decomposition cell and through which the same current as that passed through the decomposition cell is passed, said passage of hydrogen being such that it is led to the anode of the particular enrichment cell and goes quantitatively into solution electrochemically in the electrolyte of the cell whereupon an equivalent amount of hydrogen is evolved at the cathode of the respective cell, which hydrogen is finally led off from the cathode of the enrichment cell $Z^{(1)}$.

This mode of operation permits efficient enrichment of deuterium to high percentages while applying only once the full decomposition voltage and while avoiding the use of compressors and gas storage equipment.

The transportation of water between the individual cells may be accomplished by different methods. In the simplest case, it will be effected by drainage and influx of the electrolyte. As an alternative, it may be effected by means of dialysis by dialysis or exchanger diaphragm. A still further method of transportation is by evaporation of the water in the preceding cell, condensation of the vapors and passage of the condensate into the next following cell.

When allowing the electrolyte to flow through the column, a great increase in concentration of the electrolytes results due to electrolysis of water in the decomposition cell. When using a 1 N potassium hydroxide solution as the electrolyte, about 1 mol of KOH must be removed from the decomposition cell per liter of decomposed water when neglecting the back diffusion of potassium hydroxide. This may, for example, be effected by neutralization.

By back diffusion due to the concentration gradient developing within the column, part of the KOH will be removed from the cell.

If the back transportation of KOH is intended to be effected by dialysis or electrodialysis, a stationary concentration gradient must be maintained between the stages of the column which are separated by dialysis or ion exchange diaphragms. It is advantageous in this case to stir the electrolyte so that fresh electrolyte will always contact the diaphragm. When effecting the transfer of water within the column by osmosis, it is advantageous to arrange the decomposition cell such that it constitutes the highest point of the equipment so that the hydrostatic and the osmotic pressure gradient counteract each other. It is accomplished in this manner that the difference between the gas pressure in the upper and lower parts of the column needs not be too great, which pressure is necessary for pressing the wide pores of the working layer free. For pressing the pores free, the hydrostatic pressure prevailing within the cell and the osmotic pressure must be overcome as must the capillary pressure of the electrolyte in the pores. For this purpose, the porosity of the electrode is adapted to the overall pressure prevailing in the cell present for it.

The hydrogen evolved in the apparatus and the oxygen evolved in the decomposition cell may be used for any purpose. It is also possible to react the electrolytic gases in a fuel cell electrochemically to form water poor in deuterium and to return the electric energy thus produced into the enrichment process thereby obtaining an economy in energy.

The separating column used for carrying out the process and comprising an electrolytic water decomposition cell and one or several enrichment cells each provided with a hydrogen anode and a hydrogen cathode is advantageously constructed such that the electrodes used are diffusion electrodes, the pore radii of which vary over the electrode cross section with the fine-pored layer facing the gas space. On principle, however, any hydrogen and oxygen electrode may be used in a device of this kind.

It is particularly favorable to use valve electrodes as the cathodes of the enrichment cells and as the cathodes of the decomposition cells. These valve electrodes consist of a fine-pored surface layer on the electrolyte side of a material having a high hydrogen overvoltage and a wide-pored working layer facing the gas space and having a lower hydrogen overvoltage.

The hydrogen anodes of the enrichment cells may likewise be designed in the same manner as valve electrodes with very good results.

The fine-pored surface layer advantageously consists of copper and the working layer of nickel. These valve electrodes then have the electric $D/H$ separating factor of the working layer material. In addition to the materials mentioned above, other materials known for the production of hydrogen electrodes are on principle suited such, for example, as platinum, palladium, iron, and cobalt.

The oxygen anode of the decomposition cell likewise is advantageously a valve electrode comprising a fine-pored surface layer of a material having a high oxygen overvoltage and a wide-pored working layer of a material having a low oxygen overvoltage. The material preferably used for the fine-pored surface layer is titanium while the wide-pored working layer consists of nickel. The decomposition may, however, be effected with any oxygen-evolution electrode of a different type provided that care is taken by suitable construction of the cell vessel that the oxygen evolved is capable of leaving the cell or being removed without mixing with the electrolyte. This problem can be solved with any constructions known in the field of electrolysis such, for example, as by providing a suitable separator.

The valve electrodes mentioned above were already proposed. A valve electrode for hydrogen, the working layer of which has a double skeleton catalyst structure known per se and comprises 20 to 80% by weight of Raney nickel embedded in a supporting skeleton of 80% to 20% by weight of carbonyl nickel powder, was found to be particularly suitable. Its surface layer likewise has preferably a double skeleton catalyst structure and contains, for example, 20 to 80% by weight of Raney copper embedded in a supporting skeleton of fine copper powder. In case of the oxygen anode of the decomposition cells, both the working and surface layer may likewise consist of a double skeleton catalyst material.

Figure 5:
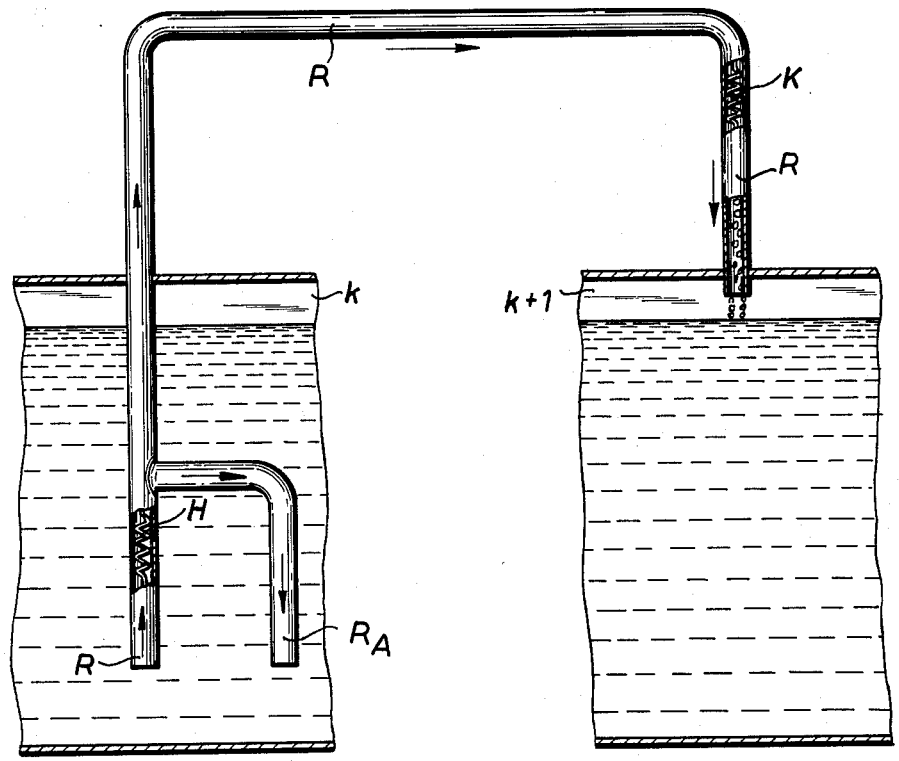

Other and further objects will become apparent from a study of the within specification and accompanying drawings, in which FIG. 1 represents a single cell with valve electrodes for hydrogen dissolution and evolution FIG. 2 represents a combination of two cells FIG. 3 represents a complete separating column FIG. 4 represents the scheme of a separating column with horizontally arranged electrodes FIG. 5 represents a detail of a laboratory separating column.

In its basic embodiment, the valve electrode comprises the fine-pored surface layer (see for instance $B_2$ in FIG. 1) having a high hydrogen minimum overvoltage and the wide-pored working layer ($A_2$ in FIG. 1) operating as the reversible hydrogen electrode. An electrode of this type is arranged as a partition wall between two spaces, of which the one contains the electrolyte adjoining the counterelectrode (V in FIG. 1) while the other ($G_2$ in FIG. 1) is a gas space. When subjecting the electrode to cathodic charging, hydrogen is evolved at the wide-pored working layer, which hydrogen is not capable of entering into the electrolyte through the fine-pored layer but enters into the gas space ($G_2$ in FIG. 1) from the working layer. Hydrogen is not evolved at the surface layer itself as long as the polarization (deviation from the reversible hydrogen potential) caused by cathodic charging is lower than the hydrogen minimum overvoltage of the surface layer, but all of the $H_2$ is evolved in the working layer. Since, inversely, the valve electrode also functions as a diffusion electrode, it is also reversible with respect to the direction of the gas flow when applying a current.

The basic cell of the present invention comprises such a valve electrode as an evolution electrode and a valve electrode of the same type as a solution electrode for hydrogen. The solution electrode may, however, be provided with a fine-pored active layer instead of the fine-pored inactive layer as the surface layer. This basic cell is represented in FIG. 1: Hydrogen gas having a deuterium concentration about equal to that of the electrolyte V is passed through gas line $L_1$ to the gas space $G_1$. The valve electrode comprising the working layer $A_1$ and the inactive surface layer $B_1$ is polarized anodically so that the gas flowing into $G_1$ goes quantitatively into the solution. However, for each hydrogen molecule brought into solution, a hydrogen molecule is evolved at the working layer $A_2$ of the opposite valve electrode. Since being incapable of penetrating the inactive surface layer $B_2$ against the capillary pressure of the electrolyte, the last-mentioned hydrogen molecule escapes into the gas space $G_2$ of this electrode. The evolved gas leaves the cell at $L_2$. Since the gas entering the gas space $G_2$ is poorer in deuterium than the electrolyte solution by the separating factor "$s$" of the electrolytic decomposition of water, the gas has lost much of its deuterium on the way from $L_1$ to $L_2$. The result hereof is that the deuterium concentration of the electrolyte flowing slowly through the cell in a direction opposed to that of the gas flow (see the arrow) has increased. $S_+$ and $S_-$ are the current conductors. This basic cell is now combined with another identical one to form a separating column.

For a better understanding, the combination in accordance with the invention of two basic cells is represented in FIG. 2. The upper index of the reference characters indicates a certain cell of the column to which the respective member is belonging while the subscripts refer to the respective electrode of the particular cell. The subscript 1 belongs to the solvent electrode and the subscript 2 to the evolution electrode. Deuterium-containing gas having the composition of the electrolyte $V^{(n+1)}$ flows from the cell $n+2$ through the gas pipe $L^{(n+1, n+2)}$ into the gas space $G_1^{(n+1)}$ of the cell $n+1$. The gas is brought into solution anodically within the working layer $A_1^{(n+1)}$ and, in its stead, the same amount of gas is evolved cathodically in the working layer $A_2^{(n+1)}$ of the counterelectrode. Thereby, the hydrogen has accepted about the same deuterium concentration as that of the electrolyte in the next cell $n$, to the solvent electrode of which it is now passed through line $L^{(n, n+1)}$. The process of minimizing the deuterium content of the hydrogen is repeated in this cell until the gas leaves the cell through $L^{(n-1, n)}$. In the meantime, the electrolyte flows at a suitable flow rate from cell $n$ to cell $n+1$ in downward direction and, in doing so, becomes enriched in deuterium. The flow of the electrolyte is controlled by diaphragms or other constrictions arranged between the cells and being adjustable if desired. In this manner, equalization of the deuterium concentration by convection and diffusion is prevented between the individual cells. In addition, these diaphragms prevent a marked number of electric current lines from proceeding between electrodes of reverse polarity directly in the electrolyte of successive cells instead of taking the intended route through the metallic current conductor S. Thus, for example, $D^{(n, n+1)}$ prevents a substantial current from passing directly from the working layer $A_1^{(n+1)}$ to the working layer $A_2^{(n)}$. In this manner, all cells of such a column which is made up of two and more identical cells can be connected in series electrically. Electric shunt can be completely prevented by effecting the liquid transportation by interrupted current paths, e.g. by droplets, or by effecting the transportation of water by evaporation, condensation of the water and transferring the condensate into the next cell.

The decomposition proper of the water takes place in a cell which constitutes the last member of the separating column. The construction of this cell is analogous to that of the cell shown in FIG. 1. It likewise consists of a valve electrode for the evolution of hydrogen and an electrode for the evolution of oxygen.

The space between the two electrodes is occupied by the electrolyte. When connecting the current conductor of the oxygen electrode with the positive pole and that of the hydrogen electrode with the negative pole of a voltage source, the water between the electrodes is electrolyzed. The resulting oxygen and hydrogen is passed into the gas space of the particular electrode.

The decomposition cell just described constitutes the terminal member of the separating column of the invention, the complete scheme of which is represented in FIG. 3. The decomposition cell $Z^{(El)}$ is arranged at the end of a separating column which comprises five additional enrichment cells $Z^{(1)}$ to $Z^{(5)}$ and is electrically connected in series with them in the manner shown.

The hydrogen gas evolved in the valve electrode of the decomposition cell, as current is passed through, is passed to the solvent electrode $E_1^{(5)}$ of the last enrichment cell $Z^{(5)}$. From here it passes electrochemically through all cells of the column and, in doing so, becomes more and more depleted of deuterium. Since all of the cells are connected in series electrically, the amount of hydrogen evolved at the valve electrode of the first cell in stationary operation is the same as that formed in the decomposition cell.

Shown in FIG. 3 as Br–E is an additional fuel cell in which the electrolytic gases are reacted.

The hydrogen anode of a cell is advantageously operated under the same operating pressure as the hydrogen cathode of the cell from which it receives hydrogen, i.e. most preferably all hydrogen anodes and cathodes are operated under the same pressure.

The electric currents are the same in all parts of the system described above. When feeding the current in the manner shown in FIG. 3 and known per se, a unit for deuterium production which is safe to operate and works without many automatic control devices results.

In stationary operation, the deuterium concentration in the electrolyte of the separating column increases from stage to stage. The electrolyte having the natural D concentration is fed to cell 1 while the electrolyte rich in deuterium is withdrawn from the decomposition cell. The quantity of $D_2O$ to be withdrawn per unit time in stationary operation is dependent upon the deuterium concentration desired in the end product and the strength of the current passing through the column. The total enrichment which can be achieved is, of course, a function of the number of stages of the column.

A more compact construction of the separating column is obtained by providing the individual cells with horizontal in place of vertical electrodes as shown in FIG. 4.

In this case, the gas spaces of the electrodes of adjacent cells interconnected by gas lines ($L^{(n, n+1)}$ in FIG. 2) may be combined to form a common gas space. This interspace can be made as small as desired, it being even possible to combine both electrodes into a common working layer having inactive surface layers on both sides of this working layer. Two valve electrodes of this kind arranged in a separating column and consisting of three layers are shown diagrammatically in FIG. 4. For example, the electrodes having No. $n$ is subjected to cathodic charging on the side facing the electrolyte space $V^{(n)}$ and covered with the inactive surface layer $B_2^{(n)}$. The hydrogen evolved in the working layer $A^{(n)}$ is poorer in deuterium by the separating factor "$s$" than the electrolyte in the space $V^{(n)}$. In contrast to this, on the side facing the gas space $V^{(n-1)}$, the electrode is subjected to anodic charging, i.e. the hydrogen goes again into solution on this side, etc. The successive electrolyte spaces are interconnected by lines R in which diaphragms or other means constricting the cross sectional area may be installed for increasing the resistance to the flow, which means may be adjustable if desired. Gas lines L in which high resistances to the flow or liquid seals are provided connect the gas spaces of the working layers of the individual electrodes to a central hydrogen line W which is under constant pressure. One of these liquid seals is, for example represented by $F^{(n+1)}$. This measure ensures dependable operation of the column over extended periods of time even if the reaction of gas or, in other words, the current yield is not 100% in all of the cells.

The central hydrogen line W mentioned above serves two functions. To be capable of starting the process of hydrogen evolution, the electrolyte must previously be displaced from the working layers of the valve electrodes against its capillary pressure. Otherwise the electrodes would only act as metallic diaphragms and the current passing therethrough would be transported preferentially along the electrolyte filaments in the pores of the electrode. However, with the working layer once filled with gas, this possibility is prevented. Moreover, the central gas line ensures by the supply of gas that the capacity of functioning of the column with respect to the gas reaction desired is retained even in case of incomplete current yield. Finally, the liquid transportation in the column may also be effected without the lines R by reducing the gas pressure in the electrodes via the central gas line to an extent such that the electrolyte is capable of occupying the working layer due to its capillary pressure thereby displacing the gas. The electrode then acts practically as a filter disc and permits mass transfer through its pores. To terminate the transportation, the gas pressure in the central hydrogen line is again brought to the operating value and the enrichment process started again. Although this method comprises intermittent operational steps, it is likewise continuous with respect to the enrichment of deuterium apart from these periodically repeated pressure changes.

Shown in FIG. 4 is the decomposition cell constituting the terminal member of the column and the separating electrode of the enrichment cell 1, which electrode is constructed as a normal two-layer valve electrode. Oxygen is evolved from the two-layer oxygen valve electrode $E_3^{(El)}$ of the decomposition cell, and hydrogen is evolved from the above-mentioned valve-electrode of the enrichment cell 1. Both of the gases may, as mentioned above, be passed to industrial utilization or recombined in an oxygen-hydrogen fuel cell with recovery of electric energy.

The manufacture of the valve electrode is not among the objects of this invention. Suitable resistances to the flow or diffusion preventing intermixing of the gas streams coming from the cathode of the individual cells via the central gas line are constituted by what is known as water seals as being used in autogenous welding. Under certain circumstances, an embodiment of gas seal designed like a gas wash bottle or a gas meter will be sufficient.

The following example serves to illustrate the invention.

EXAMPLE

In a separating column comprising four identical enrichment cells and an electrolytic water decomposition cell, the cathode of the decomposition cell as well as the cathode and the anode in the enrichment cells are valve electrodes. The manufacture of the valve electrode being described hereafter.

1.4 grams of the surface layer material are filled into a compression mold of 40 mm. diameter. The material comprises a mixture of 1.2 parts by weight of fine copper powder (particle size, <10 microns) and 1.0 part by weight of pulverulent Raney copper alloy (particle size between 10 and 35 microns). The Raney-copper alloy contains 60% by weight of copper and 40% by weight of aluminum. Following this, 11 grams of the working layer material are introduced. This material is a mixture of 1.4 parts by weight of carbonyl nickel powder and 1.0 part by weight of pulverulent Raney nickel alloy having a particle size of between 50 and 75 microns. The Raney nickel alloy contains 50% by weight each of nickel and aluminum.

The valve electrode is produced from these powders by compressing for 7 minutes at 350° C. under a pressure of 4,000 kgs./cm.². Thereafter, the electrode body is embedded in an electrode holder of a plastic composition. The aluminum is dissolved out of the electrode with 6 N KOH to obtain the Raney structure.

Two valve electrodes of this type are combined to form one enrichment cell. For this purpose, they are screwed into a plastic ring such that a space of about 3 mm. width is left between them to receive the electrolyte.

The electrolytic cell comprises a valve electrode of the type described as a hydrogen cathode and a porous nickel electrode as the oxygen anode. A fine-meshed nickel wire net keeping the evolved oxygen bubbles from the hydrogen electrode is arranged between the two electrodes. The oxygen gas evolved is removed from the decomposition cell via a reflux cooler and subsequently freed from its deuterium-rich moisture in a container cooled to low temperature.

The transportation of water between the cells is effected by evaporation in the preceding cell and recondensation in the succeeding cell. Suitable for this purpose in the laboratory separating column described above is the device represented in FIG. 5.

The U-shaped glass tube R contains an electric heater H made of alkali-resistant steel and heated by an adjustable low-voltage alternating current. Arranged above this heater is a branch pipe $R_A$ which, together with the adjacent leg of the U pipe, is immersed in the electrolyte of the cell $k$ such that the pipe $R_A$ is just completely filled by electrolyte. The other end of the U pipe terminates above the electrolyte level in the cell $k+1$ and is constructed as a cooler K in the descending section.

Water of the cell $k$ is evaporated on H by heating and, after condensation in the cooler K, is allowed to drop into the electrolyte of the cell $k+1$. Simultaneously, the heating causes circulation of the electrolyte via a branch line $R_A$ by thermosiphon effect.

The gas space of the hydrogen anode of a cell is, in accordance with the invention, connected with the cathode of the succeeding cell by a tubing which in turn is connected to a central hydrogen line via the gas seal (constructed like a gas wash bottle). By means of this hydrogen line, all of the electrodes are under a hydrogen pressure of 1.5 kgs./cm.² gauge.

Moreover, the hydrogen anodes and hydrogen cathodes of adjacent cells are connected electrically in the manner according to the invention. The column as a whole is immersed in an oil bath of 50° C.

With an overall voltage of about 2.6 v., a current having an intensity of 1 a. is flowing through the column. The current density at each electrode is then about 100 ma./cm.². Of the total voltage, about 0.2 v. is received by each of the enrichment cells and 1.8 v. by the decomposition cell.

Under these conditions, the quantity of water decomposed per day is about 8 ml. of which about $1.3 \cdot 10^{-3}$ ml. of water having the concentration ratio $$\gamma_E = \frac{\text{deuterium concentration}}{\text{hydrogenium concentration}} = 0.38$$

are recovered continuously. With a concentration ratio of natural water of $\gamma_0 = 1.4 \cdot 10^{-4}$, the separating factor "$s$" of the column is $$s = \gamma_E/\gamma_0 = 2700$$

This value corresponds to a mean separating factor, $$\bar{s} = \sqrt[5]{s}$$

of the individual cell of $s = 4.8$.

What we claim is:

1. In the process for the continuous production of deuterium-rich water by electrolytic fractionation of deuterium-poor water in successive stages in a separating column including an electrolytic water decomposition cell and at least one electrolytic enrichment cell containing an aqueous electrolyte and a hydrogen anode and a hydrogen cathode, the improvement which comprises passing deuterium-poor water through a plurality of enrichment cells in counterflow relation to a stream of hydrogen gas, electrolyzing a portion of the water leaving the last of said enrichment cells in a decomposition cell to produce gaseous hydrogen and oxygen, said enrichment cells being connected in series with said decomposition cell and being supplied with the same current as that supplied to said decomposition cell, withdrawing the electrolytically formed oxygen at the anode of said decomposition cell and from the system continuously and successively causing the hydrogen formed in each cell to be introduced at the anode of the next preceding cell whereby the same in toto goes into solution in the water contained in said cell, evolving substantially the same amount of hydrogen at the cathode of said cell whereby said hydrogen gas is successively depleted with respect to deuterium and enriches with respect to deuterium the successive bodies of water with which it comes into contact, withdrawing hydrogen from the cathode of the final enrichment cell and removing the un-electrolyzed portion of water leaving the decomposition cell.

2. Improvement according to claim 1 wherein said deuterium-poor water is natural water.

3. Improvement according to claim 1, which comprises regulating the counterflow passage of water between successive cells by passing said water through permeable diaphragms separating each of said cells.

4. Improvement according to claim 1, which comprises regulating the counterflow passage of water between successive cells by forming a vapor of the water in a preceding cell, condensing said vapor and passing the condensate into the next succeeding cell.

References Cited by the Examiner

UNITED STATES PATENTS

| | | | |
|---|---|---|---|
| 2,044,704 | 6/1936 | Knowles | 204—101 |
| 2,681,887 | 6/1954 | Butler | 204—258 |
| 2,690,380 | 9/1954 | Taylor | 204—101 |
| 2,695,268 | 11/1954 | Wright | 204—101 |
| 2,695,874 | 11/1954 | Zdansky | 204—258 |
| 2,928,891 | 3/1960 | Justi et al. | 204—101 |

FOREIGN PATENTS

| | | |
|---|---|---|
| 194,368 | 1/1958 | Austria. |
| 1,023,017 | 1/1958 | Germany. |
| 620,837 | 3/1949 | Great Britain. |

JOHN H. MACK, *Primary Examiner.*

JOSEPH REBOLD, JOHN R. SPECK, MURRAY TILLMAN, *Examiners.*

T. TUNG, *Assistant Examiner.*